Patented Oct. 14, 1924.

1,511,919

UNITED STATES PATENT OFFICE.

LUDWIG TAUB, LUDWIG SCHÜTZ, AND KURT MEISENBURG, OF ELBERFELD, GERMANY, ASSIGNORS TO FARBENFABRIKEN VORM. FRIEDR. BAYER AND CO., OF LEVERKUSEN, NEAR COLOGNE-ON-THE-RHINE, GERMANY.

HYPNOTIC.

No Drawing.    Application filed August 27, 1923. Serial No. 659,660.

*To all whom it may concern:*

Be it known that we, LUDWIG TAUB, LUDWIG SCHÜTZ, and KURT MEISENBURG, citizens of Germany, residing at Elberfeld, in the State of Prussia, Germany, have invented new and useful Improvements in Hypnotics, of which the following is a specification.

The present invention relates to the manufacture and production of the hitherto unknown crotylallylbarbituric acid having the formula:

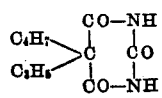

which has proved to be a valuable hypnotic; an average dose being from ¼ to ½ gram. The process for its production consists in condensing crotylallylmalonic acid ester with urea in the presence of sodium alcoholate

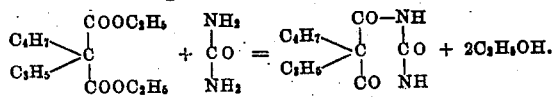

In order to illustrate the new process more fully the following example is given, the parts being by weight:

255 parts of crotylallylmalonic acid ester are added to a solution of 46 parts of sodium in 800 parts of absolute alcohol. 60 parts of urea are added thereto and the mixture is heated to boiling in a vessel provided with a reflux condenser during 5 hours. Subsequently the alcohol is distilled off, water is added to the residue. The liquid is neutralized with dilute hydrochloric acid. The crotylallylbarbituric acid precipitates from the liquid as an oil which soon solidifies.

Our new substance crystallizes from water in the shape of white needles melting at 125-126° C. and dissolves in alcohol. It possesses the property of forming salts with many metals e. g. the alkali metals, or calcium, the hydrogen of the NH group being replaced by the metal. It may be either used in the acid or salt form. The sodium salt is a white crystalline powder easily soluble in water.

We claim:—

As a new product crotylallylbarbituric acid of the formula:

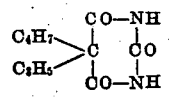

crystallizing from water in the shape of white needles melting at 125-126° C.; forming salts with alkali metals and calcium; and being a valuable hypnotic, substantially as described.

In testimony whereof we have hereunto set our hands.

LUDWIG TAUB.
LUDWIG SCHÜTZ,
KURT MEISENBURG.